Sheet 1, 2 Sheets.
R. Allison.
Steam Pump.
No. 3,573. Reissued Aug. 3, 1869.
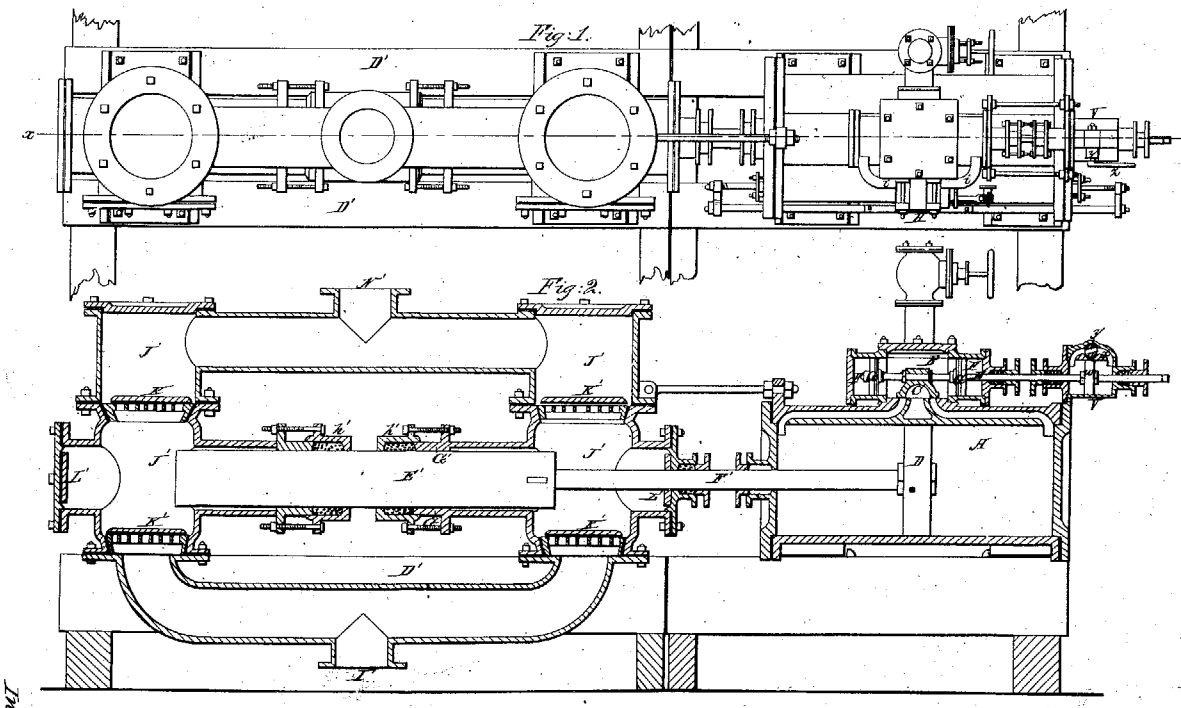
Witnesses.
Wm. A. Morgan
C. C. Bolton
Inventor.
per Munn & Co.
attorneys Sheet 2, 2 Sheets.
R. Allison.
Steam Pump
No. 3,573. Reissued Aug. 3, 1869.
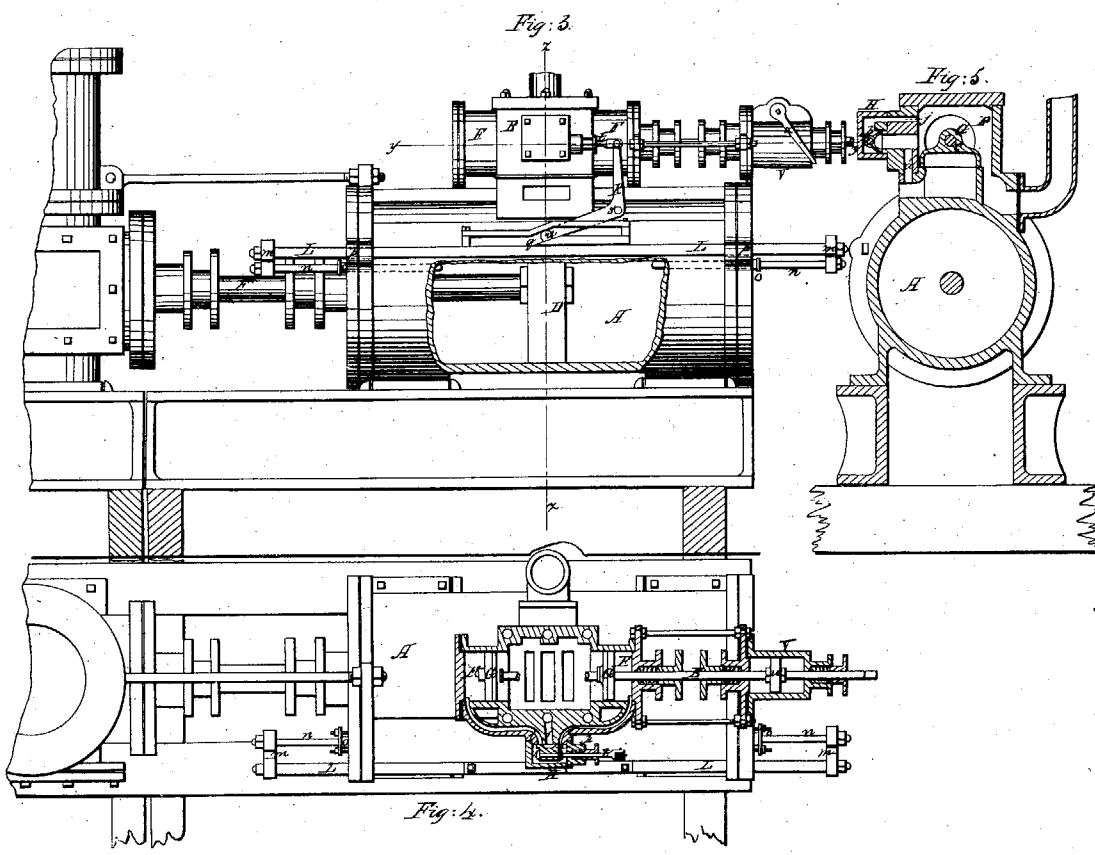
Witnesses:
Jno. A. Morgan
G. E. Corlton
Inventor:
R. Allison
per Munn & Co
Attorneys

United States Patent Office.

ROBERT ALLISON, OF PORT CARBON, PENNSYLVANIA.

*Letters Patent No* 82,475, *dated September* 29, 1868; *reissue No.* 3,573, *dated August* 3, 1869.

IMPROVEMENT IN STEAM PUMPING-ENGINES.

The Schedule referred to in these Letters Patent and making part of the same.

*To all whom it may concern:*

Be it known that I, ROBERT ALLISON, of Port Carbon, in the county of Schuylkill, and State of Pennsylvania, have invented a new and useful Improvement in Steam Pumping-Engines; and I do hereby declare that the following is a full, clear, and exact description thereof, which will enable others skilled in the art to make and use the same, reference being had to the accompanying drawings, forming part of this specification.

The object of this invention is to overcome difficulties which have hitherto been experienced in the use of pumping-engines for raising water from deep mines, and in other situations where it is necessary to raise the water to a considerable height; and The invention consists in so operating the valve-gear of the engine, that the jar produced by concussion, which has heretofore proved so destructive to pumping-engines, is avoided. This is done by providing a supplementary steam-chest, and auxiliary cylinders and pistons, with a liquid-regulating cylinder, whereby the piston of the engine is cushioned on steam at each end of the cylinder at each stroke, and gives an easy and uniform motion.

It also consists in the construction and arrangement of the pump and valves, as will hereinafter be more fully described.

Figure 1 is a top or plan view of the whole apparatus.

Figure 2 is a vertical longitudinal section of fig. 1, through the line *x–x*, showing the supplementary steam-chest, and auxiliary cylinders and pistons, with the parts connected therewith.

Figure 3 is a side elevation of the engine, partly in section, showing the method in which the valve is operated in the supplementary steam-chest.

Figure 4 is a horizontal section of fig. 3, through the line *y–y*.

Figure 5 is a vertical section of fig. 3, through the line *z–z*.

Similar letters of reference indicate corresponding parts.

A represents the steam-engine cylinder.

B is the main steam-chest.

C is the main valve.

D is the piston in the main cylinder.

E is the valve-rod.

F F represent auxiliary steam-cylinders, connected with the steam-chest B, and

G G represent pistons working in those cylinders, which are rigidly attached to the valve-rod.

H represents a supplementary steam-chest, attached to the chest B, and in communication with the auxiliary cylinders F F, through the ports *i i*.

Steam exhausts from this chest through the opening *j*.

*k* is a sliding valve in this chest.

This valve is operated by a mechanism represented in fig. 3, and consisting of a sliding bar, L, on the outside of the steam-cylinder, to the ends of which are attached, by arms *m m*, two rods, *n n*, which enter the cylinder through stuffing-boxes, as seen at *o o*.

bar L has its bearings in the flanges of the cylinder heads, through which it slides, as seen at *p p*.

Longitudinal motion is given to this bar by the piston of the engine at each end of the stroke, as it traverses the cylinder.

*q* is a cam-slot, attached rigidly to the bar L.

R is a bell-crank, whose pivot is at S, one arm of which is connected with the rod *t* of the valve *k* in the supplementary chest H.

Upon the other arm there is a roll or wrist, *u*, which is placed in the cam-slot *q*.

It will be seen that the longitudinal motion of the cam-slot on the sliding bar L will impart an oscillating motion to the bell-crank, and thereby operate the valve *k*, and open alternately the ports *i i* leading to the auxiliary cylinders F F. This moves the pistons G, and operates the main valve of the engine.

V represents an oil or water-cylinder, through which the valve-rod E passes, as seen in figs. 2 and 4.

*w* is a piston on the valve-rod, which works in this cylinder V.

The cylinder is filled with water, oil, or other liquid, and the object of it is to regulate the motion of the main valve.

The piston *w* is solid, and the ends of the cylinder on each side of the piston are in communication through the channel *x*, as seen in fig. 2.

*y* is a cock in the channel or passage-way *x*, and the liquid is forced back and forth through it as the piston moves in the cylinder.

The time employed in changing the liquid from one side of the piston to the other, is regulated by the cock *y*.

The cock *y* may be adjusted by hand through the lever *z*, or by mechanism connected with the governor of the engine, or by any other suitable device.

The steam which operates the valve through the auxiliary cylinders F, is discharged into the exhaust-port of the engine, through the passage-way *a'*, as seen in fig. 5.

The operation is as follows:

When steam is introduced, the piston of the engine moves until it comes in contact with the end of one of the rods *n*, and imparts motion to the sliding bar L.

When the cam of the slot *q* reaches the roller *u* on the arm of the bell-crank, the supplementary valve *k* is moved. This allows steam to enter one of the auxiliary cylinders F, which gives motion to the pistons G and to the main valve.

Should the steam be allowed to act on the pistons G

G without any regulating or controlling-arrangement, the valve would be too suddenly moved, but by the use of the regulating-cylinder V, using therein the liquid as a cushion, complete control is obtained over the movement of the valve.

Should the regulating-cock *y* be closed, the liquid could not pass.

Should the cock be entirely open, the piston would be free to move as fast as the steam would drive it, but by regulating the opening with the cock *y*, complete control is gained over the valve, and the movement can be regulated to suit the speed of the pump and the amount of work to be done.

The whole arrangement is such that it commences the movement of the main valve at a point far enough from the end of the stroke of the piston to allow of a gradual shutting off and letting on of steam, thereby giving an easy an uniform motion to the piston of the engine and the plunger of the pump, free from any jar or shock, in reversing the motion at the end of the stroke.

In using the regulating-cylinder, it is necessary to commence the movement of the valve before the piston of the engine reaches the end of the stroke, otherwise the most useful effect of the regulating-cylinder is lost, but where the valve begins to move when the piston is from six to twelve inches from the end of the stroke, the movement can be so controlled by the regulating-cylinder V, through the graduating-cock or valve Y, that the piston is prevented from striking the cylinder-caps.

This arrangement allows of a gradual shutting off and letting on of the steam, thereby preventing any jar or shock at the end of the stroke.

In this fact lies the whole advantage of the use of a regulating-cylinder—a gradual shutting off and letting on of the steam.

I do not confine myself to the particular method herein set forth for operating the supplementary valve, as it may be necessary to vary it somewhat in the construction of different kinds of pumps.

In connection with the above-described steam-cylinder and valve-motion, I construct a double-acting plunger-pump, arranged substantially as shown in the drawings.

This pump consists of the bed-plate D′ D′, which may be made in either one or two sections, so as to render it easy of transportation or removal in case repairs are needed.

E′ is the plunger, which is attached directly to the piston-rod F′ of the engine.

G′ G′ are the working-barrels, with reversed stuffing-boxes *h′ h′*.

J′ represents the valve-chambers.

K′ represents the valves.

L′ represents rubber or elastic cushions, placed in the two lower valve-chambers, to prevent the plunger from striking the caps in case the piston should, from any cause, be driven too far.

I′ is the inlet, and N′ is the outlet of the pump, but I do not confine myself to this particular arrangement for these openings, but may make them at any other convenient point, without altering the general construction or arrangement of the pump.

Having thus described my invention,

What I claim as new, and desire to secure by Letters Patent, is—

1. The arrangement of the sliding bar L, cam-slot *q*, rods *n n*, and bell-crank R, whereby the supplementary valve *k* is operated, substantially as shown and described.

2. The valve-chambers J′, valves K′, and reversed stuffing-boxes *h′*, arranged substantially as shown and described for the purposes set forth.

3. The arrangement of the piston *w*, graduating-cock *y*, and cylinder V, with reference to the rod E, pistons G G, and main valve C, as herein shown and described.

4. The combination and arrangement, with the slide-valve C of the direct-acting pumping-engine, of the regulating-apparatus, consisting of the dash-pot or cylinder with the passage *x*, leading from end to end, the solid piston, and the regulating-cock, the said cylinder containing a liquid substance, operating as the medium whereby to regulate the action of the piston in both directions, substantially as specified.

ROBT. ALLISON.

Witnesses:

DAVID WILKINS,
H. H. HADESTY.